Nov. 22, 1966 E. METCALF 3,287,723
DIGITAL VOLTMETERS
Filed July 27, 1965
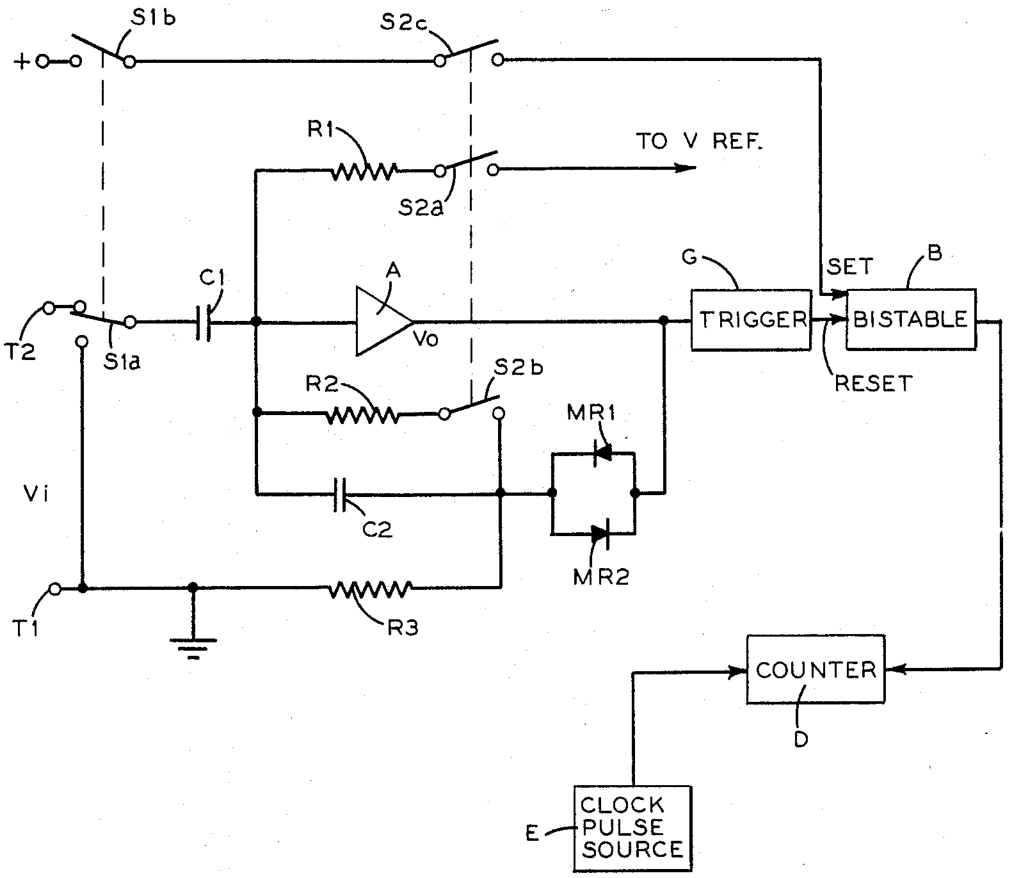
INVENTOR.
Eric Metcalf United States Patent Office 3,287,723

Patented Nov. 22, 1966

3,287,723

DIGITAL VOLTMETERS

Eric Metcalf, Farnborough, England, assignor to The Solartron Electronic Group Limited, Farnborough, England Filed July 27, 1965, Ser. No. 475,076
Claims priority, application Great Britain, Aug. 4, 1964, 31,577/64
2 Claims. (Cl. 340—347)

This invention relates to digital voltmeters, that is to say to devices which indicate the magnitude of an input voltage by a numerical count of pulses. Such devices are also sometimes known as analogue to digital converters.

It is quite commonly required to measure a voltage using a logarithmic scale, if only because of the extensive use of decibels in electrical measurements. The object of this invention is to provide a digital voltmeter which yields a logarithmic measurement directly.

According to the invention there is provided a digital voltmeter comprising an operational amplifier with capacitive feedback, first switching means whereby a charge proportional to the input voltage may be discharged into the amplifier (effectively into the feedback capacitor), second switching means for connecting a reference voltage source to the amplifier input through a resistor and for simultaneously establishing a second resistive feedback path in parallel with the capacitive feedback path, and means responsive to the amplifier output voltage for counting clock pulses from the instant that the second switching means are closed following discharge of the charge proportional to the input voltage into the amplifier until the output voltage returns to a datum level. The output voltage follows an exponential ramp from the said instant.

It will hereinafter be shown that the clock pulse count is proportional to the logarithm of the input voltage if the second switching means are first closed to establish an initial amplifier output level, then opened while the input charge is put into the amplifier and subsequently closed again at the commencement of the ramp.

An operational amplifier is a high gain D.C. amplifier with a lot of feedback on account of which its input preserves a virtual earth. How high the gain must be and how much feedback is required depend upon the overall accuracy required. An operational amplifier with the appropriate feedback can also have a suitably low output impedance. Because both the charging current determined by the input voltage to be measured and the ramp current which flows when the second switching means are closed pass through the same amplifier, its linearity and zero error are not controlling factors in the accuracy of the measurement. The virtual earth does not therefore have to be precisely at zero reference volts. Drift on the other hand can affect the results but stability is only required over the interval required to complete a measurement.

A variety of different means may be used to feed the input charge into the amplifier, including potentiometric arrangements using an amplifier with two inputs. Means may be included for increasing the accuracy with which the end of the ramp is determined.

Thus, the output of the amplifier may be connected to a current sink through a unidirectional switch which is included in the feedback path between the amplifier output and the capacitor. Because of the very low effective output impedance of the operational amplifier the current flowing to the sink can be disregarded. During the initial charging interval the charging current and sink current flow additively through the switch in the forward direction. The ramp current which then discharges the capacitor subtracts from the sink current which, however, keeps the switch closed until the feedback capacitor is substantially discharged. The switch then opens because there is insufficient potential across it and the feedback path is broken. The amplifier output voltage swings violently in the direction in which it has been moving steadily during the ramp and the circuit used to indicate the end of the ramp operates substantially instantaneously.

One embodiment of the invention is illustrated in the diagram constituting the sole figure of the accompanying drawing and will be described by way of example.

The input voltage $Vi$ is applied bewteen an earthed terminal $T_1$ and a terminal $T_2$ which is connected to a fixed contact of a changeover switch S1*a*. The other fixed contact is connected to earth and the movable contact is connected through an input capacitor C1 to the input of an operational amplifier A. A stable source of volage $Vref$ may also be connected to the amplifier input through a switch S2*a* and a resistor R1. The amplifier has a feedback path through oppositely poled diodes MR1 and MR2 and a capacitor C2. The latter capacitor may be shunted by a resistor R2 by closing another switch S2*b*. The junction of the two diodes with the capacitor C2 is connected to earth through a small resistor R3.

The output of the amplifier is connected to a trigger circuit G which resets a bistable B at the end of the ramp when the output voltage $Vo$ of the amplifier returns to zero volts. The bistable is previously set by closure of switches S1*b* and S2*c* in series and is used in known fashion to cause clock pulses from a clock pulse source E to be counted by a counter D only so long as the bistable circuit is in its set state.

The switches S1*a* and S1*b* are operated together and may be spring sets of a relay. S2*a*, S2*b* and S2*c* are also operated together. They may be three transistor switches driven from a common source of switching potential.

In operation the switches S1 are initially as shown, whereby the capacitor C1 is charged to $Vi$. The switches S2 are closed for an interval to bring $Vo$ to the value $-VrefR2/R1$. The bistable B is not set in this interval because S1*b* is open. The switch S2 are opened again when the amplifier temporarily holds the quoted value for $Vo$. The switches S1 are then operated, so earthing the capacitor C1 and causing it to transfer its charge to C2 whereby $Vo$ assumes the value $$Vo=ViC1/C2-VrefR2/R1$$

The switches S2 are again closed and the bistable B is set because both S1*b* and S2*c* are closed. The currents flowing into the amplifier input, which constitutes a summing junction are $Vo/R2$, $$C2\frac{dVo}{dt}$$

and $Vref/R1$. The sum of these currents is zero. Accordingly, if $\overline{V}o$ represents the Laplace Transform of $Vo$ the equation describing the operation of the amplifier is $$\overline{V}o/R2+C2(p\overline{V}o-ViC1/C2+VrefR2/R1)+Vref/pR1=0$$

where $p$ is the operator $d/dt$.

The solution of this equation is $$Vo=(ViC1/C2)\exp(-t/C2R2)-VrefR2/R1$$

$Vo$ thus falls exponentially to the value $VrefR2/R1$, passing through zero at the time $$t=C2R2\log_e(ViR1C1/VrefR2C2)$$

Since the bistable B resets as $Vo$ passes through zero it is this time $t$ which is measured and the time is equal to a constant plus to term proportional to log V*i*, all other quantities being fixed. The constant term can be arranged to establish the required reference level for a decibel reading.

For example, one suitable set of values is:

| | |
|---|---|
| C1 | 28 nF. |
| R1 | 1.8M ohms. |
| V*ref* | +9 v. |
| C2 | 43.4 nF. |
| R2 | 100K ohms. |

These values yield $t$=10 ms. for 20 db with respect to 0.77 v. which is the level of 1 mw. in 600 ohms, a commonly used standard. If the clock pulse period is 5 $\mu$s., the counter reads in millibels.

The function of MR1 and MR2 has not been mentioned. Their forward voltages introduce small deviations in the end of ramp values for V*o* (approached from above and below) but these deviations can be allowed for. The function of the diodes is to cause the feedback path to be nearly open circuited just before crossing zero. Thus zero is crossed very rapidly and is well defined. The diodes operate in conjunction with the current sink through R3 in the way described in outline above, two being provided in order to deal with either polarity of input voltage.

When the switches S1 are operated and charge is transferred to C2 the charging current for C2 and sink current through R3 flow additively through MR1 or MR2. When S2 is again closed the ramp current for discharging C2 flows in opposition to the sink current through R3 but the latter preponderates and keeps the relevant one of the diodes conducting until C2 is substantially discharged and there are insufficient volts across the relevant one of the diodes which cuts off and becomes an effective open circuit breaking the feedback path. V*o* therefore swings violently in the direction in which it has been moving steadily while C2 discharges and the trigger circuit G (e.g. a Schmitt trigger) operates substantially instantaneously.

I claim:

1. A digital voltmeter comprising in combination:
an operational amplifier having an input circuit and an output circuit;
a capacitive feedback network coupled between said output and input circuits;
an input terminal adapted to receive an input voltage;
first switching means coupled between said input terminal and said input circuit of said amplifier for providing to said input circuit an electric charge proportional to said input voltage;
a source of reference voltage; second switching means;
a resistive feedback network connected between said output and input circuits, said second switching means coupling said source of reference voltage and said resistive feedback network to the input of said amplifier, said second switching means being operable to simultaneously connect said reference voltage source to said input circuit of said amplifier and also to establish said resistive feedback network;
a source of clock pulses; and
means coupled to the output circuit of said amplifier for counting clock pulses from the instant that said second switching means are operated following the application of a quantity of charge proportional to the input voltage into the amplifier until the output of said amplifier returns to a datum level.

2. A digital voltmeter according to claim 1, further comprising unidirectional switching means coupled between said amplifier output circuit and said capacitive feedback means and a current sink connected to said amplifier output circuit through said unidirectional switching means.

References Cited by the Examiner

UNITED STATES PATENTS 3,188,455 6/1955 Quick ---------- 340—347

DARYL W. COOK, *Acting Primary Examiner.*

W. J. KOPACZ, *Assistant Examiner.*